US008151074B2

(12) United States Patent
Li

(10) Patent No.: US 8,151,074 B2
(45) Date of Patent: Apr. 3, 2012

(54) SOFTWARE PROTECTION METHOD

(75) Inventor: Yung-Hsin Li, Taipei (TW)

(73) Assignee: Inventec Corporation, Taipei (TW)

( * ) Notice: Subject to any disclaimer, the term of this patent is extended or adjusted under 35 U.S.C. 154(b) by 379 days.

(21) Appl. No.: 12/622,445

(22) Filed: Nov. 20, 2009

(65) Prior Publication Data

US 2010/0131730 A1 May 27, 2010

(30) Foreign Application Priority Data

Nov. 27, 2008 (TW) .............................. 97145981 A

(51) Int. Cl.
*G06F 12/00* (2006.01)
(52) U.S. Cl. ...................................................... 711/163
(58) Field of Classification Search ........................ None
See application file for complete search history.

(56) References Cited

U.S. PATENT DOCUMENTS

| 5,991,197 | A | * | 11/1999 | Ogura et al. | ............. | 365/185.11 |
| 6,154,819 | A | * | 11/2000 | Larsen et al. | ................. | 711/163 |
| 7,249,231 | B2 | * | 7/2007 | Babudri et al. | ............... | 711/156 |
| 8,041,912 | B2 | * | 10/2011 | Kuo et al. | ..................... | 711/163 |
| 2009/0204770 | A1 | * | 8/2009 | Jeong | ............................. | 711/147 |

OTHER PUBLICATIONS

Bing Yang, "Analysis and implementation for producer/consumer problems", in Journal of Xihua University(Natural Science Edition), 25(2), p. 13-15, Mar. 31, 2006 with its EN abstract.

\* cited by examiner

*Primary Examiner* — Hiep Nguyen
(74) *Attorney, Agent, or Firm* — CKC & Partners Co., Ltd.

(57) ABSTRACT

A software protection method to protect the software in a host against an unauthorized usage of a memory unit used in software is provided. The software protection method comprises the steps of: starting the operation of the software; declaring the memory unit such that the software takes the control right of the memory unit; generating a status tag of the memory unit; setting the status tag as an initializing status to initialize the memory unit; setting the status tag as an access status to access the memory unit; and setting the status tag as a delete status to forgo the control right of the memory unit.

5 Claims, 3 Drawing Sheets

SOFTWARE PROTECTION METHOD

RELATED APPLICATIONS

This application claims priority to Taiwan Application Serial Number 97145981, filed Nov. 27, 2008, which is herein incorporated by reference.

BACKGROUND

1. Field of Invention

The present invention relates to a software protection method. More particularly, the present invention relates to a software protection method to protect the software in a host against an unauthorized usage of a memory unit.

2. Description of Related Art

During the operation of software, various kinds of variables and objects are used to store temporary data or to call other functions in the software. The use of the variables and objects requires the access of the memory units, such as registers, to access the data. However, if the user doesn't use the variables or objects carefully during the operation of the software such that different software accesses the same memory unit at the same time, the data in the memory unit can be incorrect. Further, the software may suffer damage due to the inappropriate access of the memory.

Accordingly, what is needed is a software protection method to protect the software in a host against an unauthorized usage of a memory unit.

SUMMARY

A software protection method to protect the software in a host against an unauthorized usage of a memory unit used in software is provided. The software protection method comprises the steps of: starting the operation of the software; declaring the memory unit such that the software takes the control right of the memory unit; generating a status tag of the memory unit; setting the status tag as an initializing status to initialize the memory unit; setting the status tag as an access status to access the memory unit; and setting the status tag as a delete status to forgo the control right of the memory unit.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
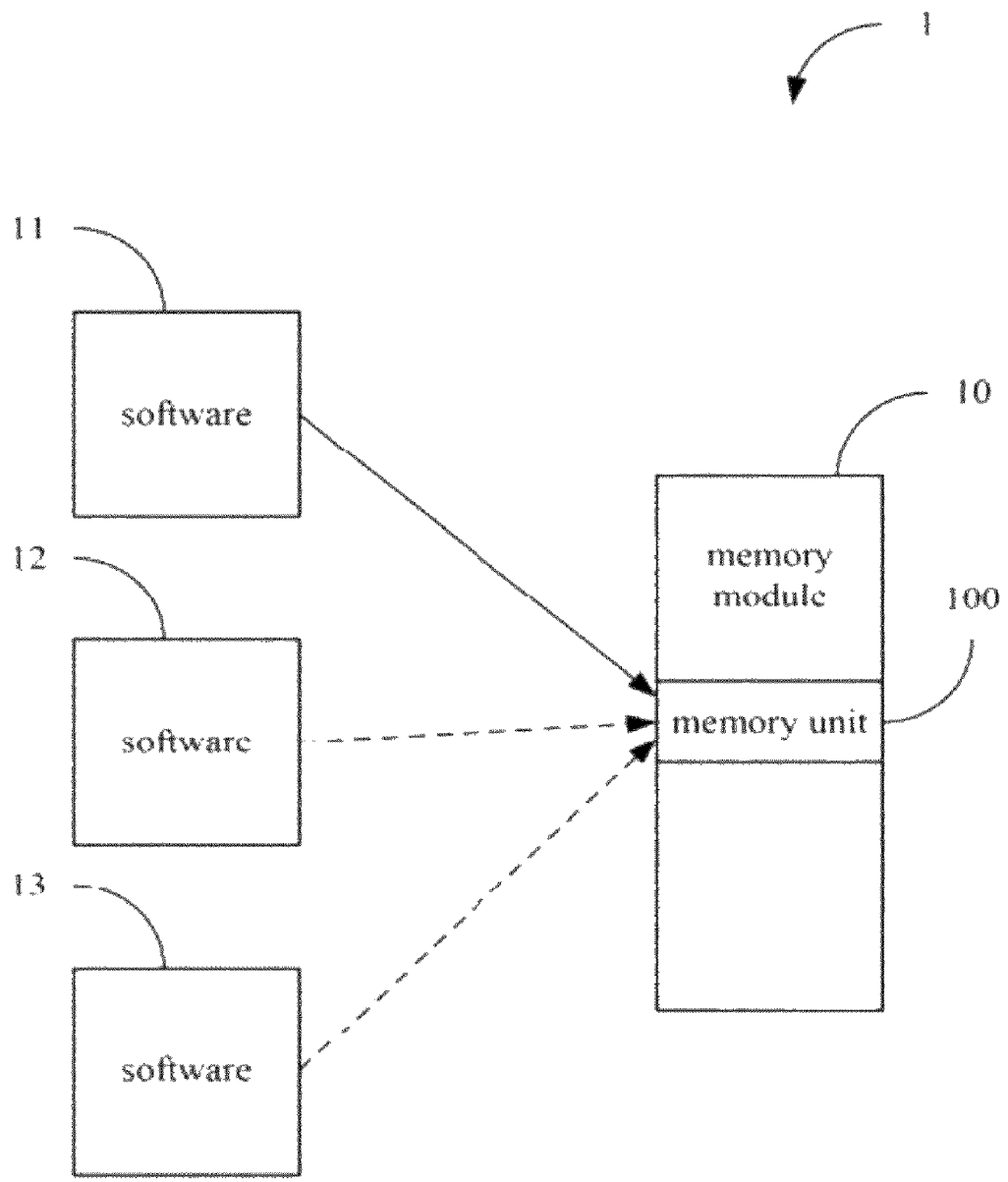
FIG. 1 is a diagram of a host in the first embodiment of the present invention.

Reference will now be made in detail to the present embodiments of the invention, examples of which are illustrated in the accompanying drawings. Wherever possible, the same reference numbers are used in the drawings and the description to refer to the same or like parts.

Please refer to FIG. 1. FIG. 1 is a diagram of a host 1 in the first embodiment of the present invention. The host 1 comprises memory module 10, software 11, 12 and 13. The memory module 10 further comprises a memory unit 100. During the operation of the software 11, the data access is performed on the memory unit 100. However, if the software 12 or 13 are in operation and access the memory unit 100 at the same time, the data in the memory unit can be incorrect. Further, the software 11, 12 or 13 may suffer damage due to the inappropriate access of the memory.

Figure 2:
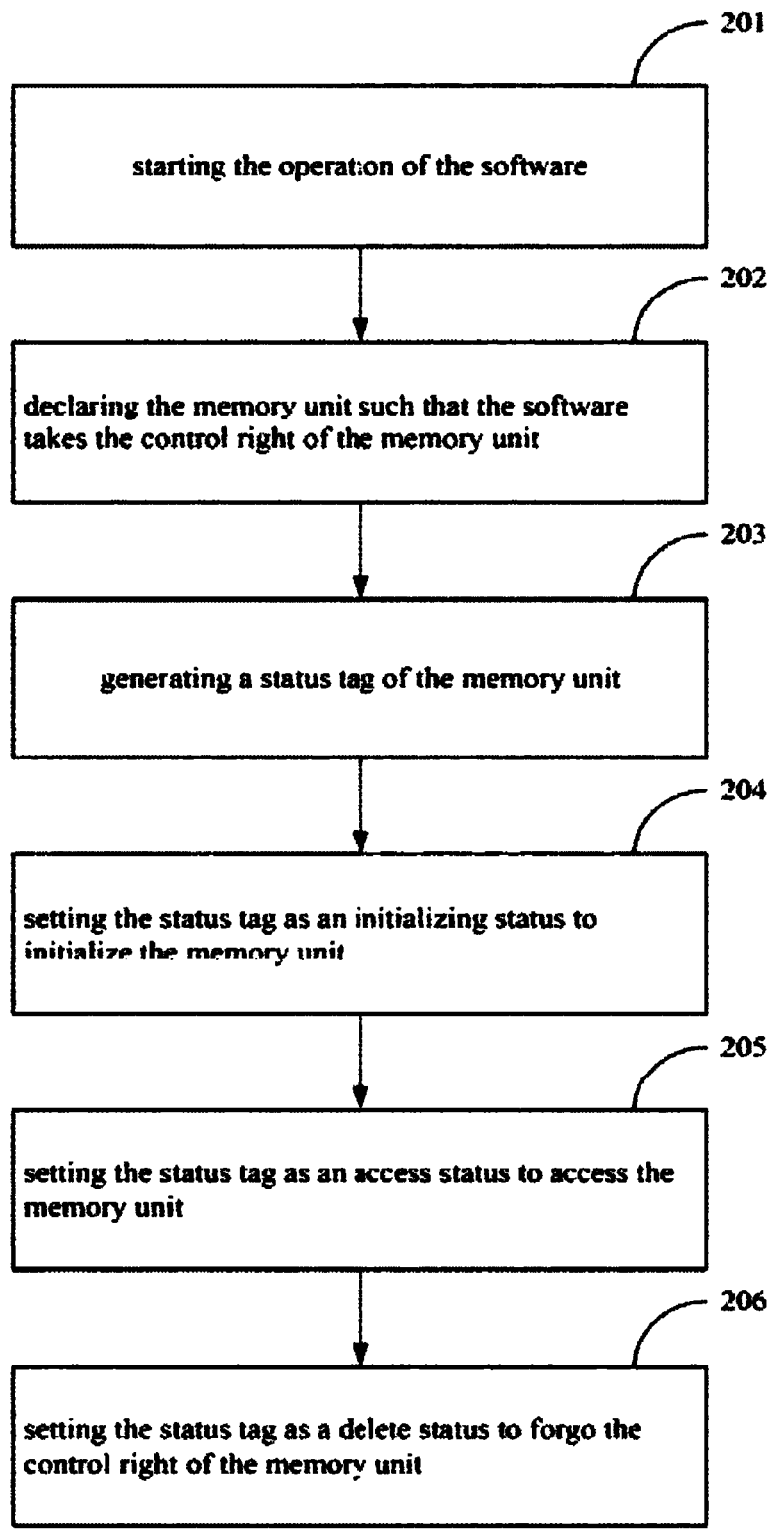
FIG. 2 is the flow chart of the software protection method of the first embodiment of the present invention.

FIG. 2 is the flow chart of the software protection method of the first embodiment of the present invention, wherein the software protection method is to protect the software 11 of the host 1 as depicted in FIG. 1. The software protection method protects the software 11 against an unauthorized usage of a memory unit by software 12, 13 or other software (not shown) in the host 1. The software protection method comprises the steps of: in step 201, starting the operation of the software; in step 202, declaring the memory unit such that the software takes the control right of the memory unit. The software declares the memory unit through a declaration of a variable or an object. In step 203, generating a status tag of the memory unit. If the software declares the memory unit through an object, the status tag can be a member of the object. Thus the status tag is generated along with the declaration of the object. If the software declares the memory unit through a variable such as an integer or a string, an additional monitoring software (not shown) is needed to generate the status tag of the memory unit and to modify the status tag. In another embodiment, a function in the software 11 can also be designed to generate and modify the status tag. After the declaration of the memory unit and the generation of the status tag, the software protection method proceeds to step 204, to set the status tag as an initializing status to initialize the memory unit. In the initializing status, only the software 11 can perform initialization of the memory unit. The software 12, 13 and other software are not allowed to access the memory unit to avoid the initialing data in the memory unit from being modified. Then in step 205, setting the status tag as an access status to let the software 11 accesses the memory unit. Similarly, the software 12, 13 and other software are still not allowed to access the memory unit to avoid the data in the memory unit from being modified. And then in step 206, setting the status tag as a delete status to forgo the control right of the memory unit when the data access is finished. When the control right is forgone, the memory unit is no longer protected and the other software can perform data access on the memory unit.

Figure 3:
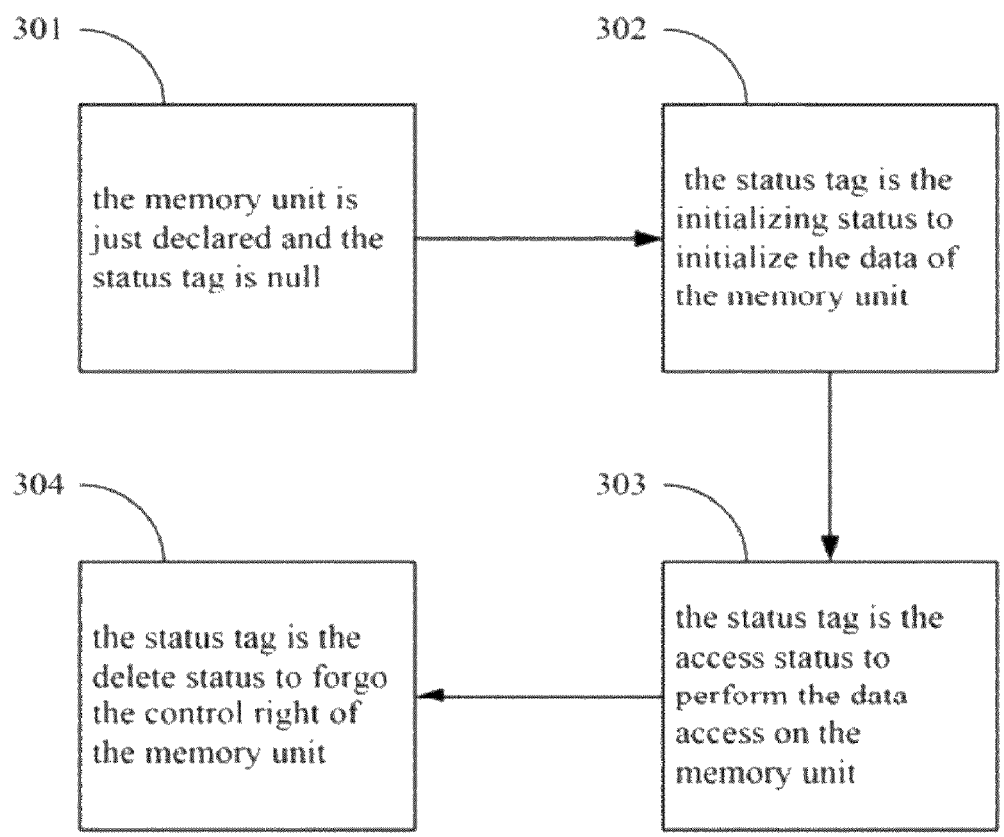
FIG. 3 is a diagram depicting each state of the memory unit of an embodiment of the present invention.

Please refer to FIG. 3. FIG. 3 is a diagram depicting each state of the memory unit. The software protection method in the present invention makes use of the concept of the finite state machine. In state 301, the memory unit is just declared, and the status tag is null. Then in state 302, the status tag is the initializing status to initialize the data of the memory unit. In state 303, the status tag is the access status to perform the data access on the memory unit. Then in state 304, the status tag is the delete status to forgo the control right of the memory unit.

The advantage of the present invention is to use the status tag to monitor the access authority in different state to prevent the damage caused by the unauthorized usage of the memory unit.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A software protection method to protect the software in a host against an unauthorized usage of a memory unit used in the software, the software protection method comprises the steps of:
    starting the operation of the software;
    declaring the memory unit such that the software takes the control right of the memory unit;
    generating a status tag of the memory unit;
    setting the status tag as an initializing status to initialize the memory unit;
    setting the status tag as an access status to access the memory unit; and
    setting the status tag as a delete status to forgo the control right of the memory unit.

2. The software protection method of claim 1, wherein the software declares the memory unit through a declaration of a variable.

3. The software protection method of claim 1, wherein the software declares the memory unit through a declaration of an object.

4. The software protection method of claim 3, wherein the status tag is a member of the object.

5. The software protection method of claim 1, wherein the host further comprises a monitoring software, the monitoring software generates the status tag and modifies the status tag after the declaration of the memory unit.

* * * * *